March 10, 1970
L. J. ARP ETAL
3,500,154
DIGITAL CONTROL FOR A STEPPING MOTOR DRIVE USED IN AN
AUTOMATIC DRAFTING MACHINE
Filed May 9, 1967
9 Sheets-Sheet 1
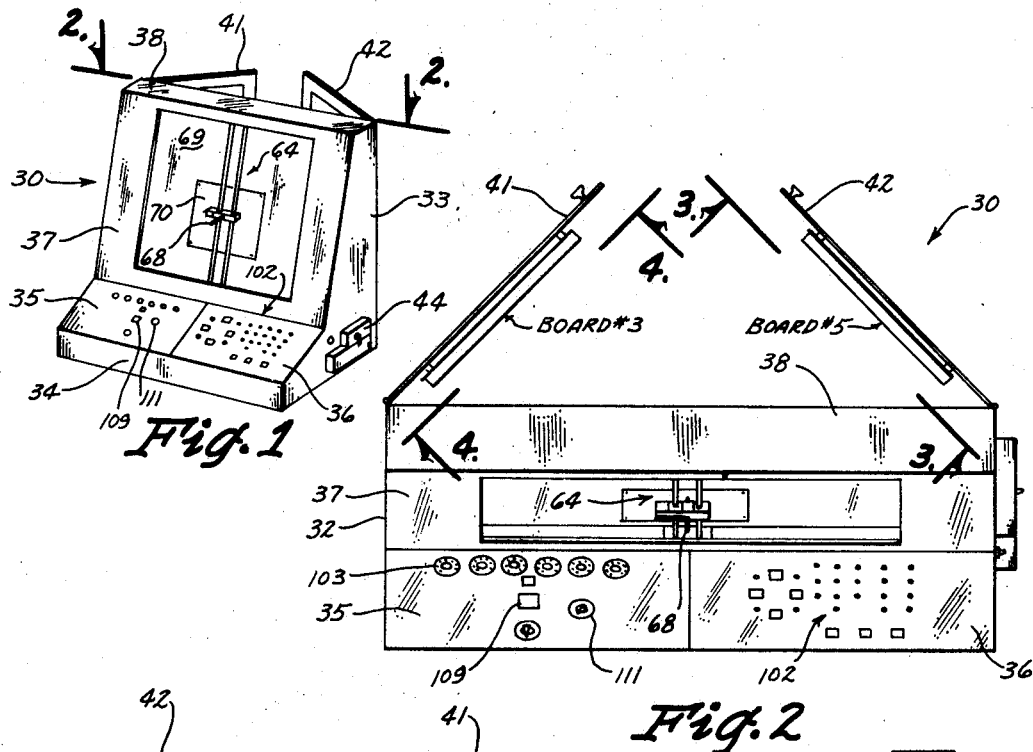
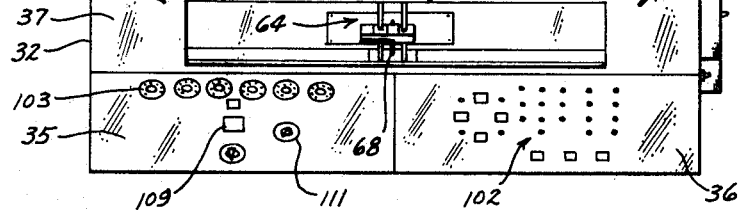
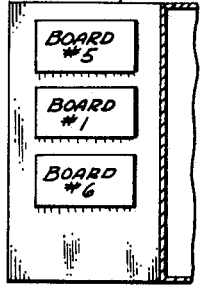
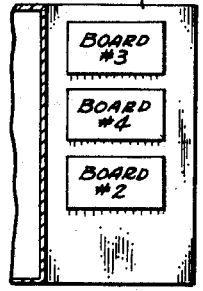
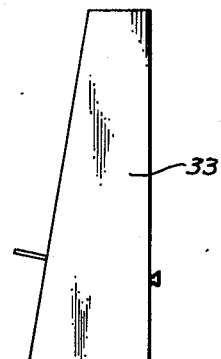
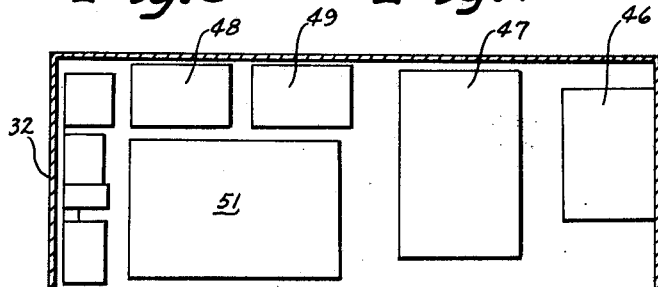
INVENTORS
LEON J. ARP,
By WAYNE C. DOWLING
N. Robert Henderson
ATTORNEY

INVENTORS
LEON J. ARP,
WAYNE C. DOWLING
BY
ATTORNEY

INVENTORS
LEON J. ARP,
WAYNE C. DOWLING
BY
ATTORNEY

INVENTORS
LEON J. ARP,
WAYNE G. DOWLING
By
ATTORNEY

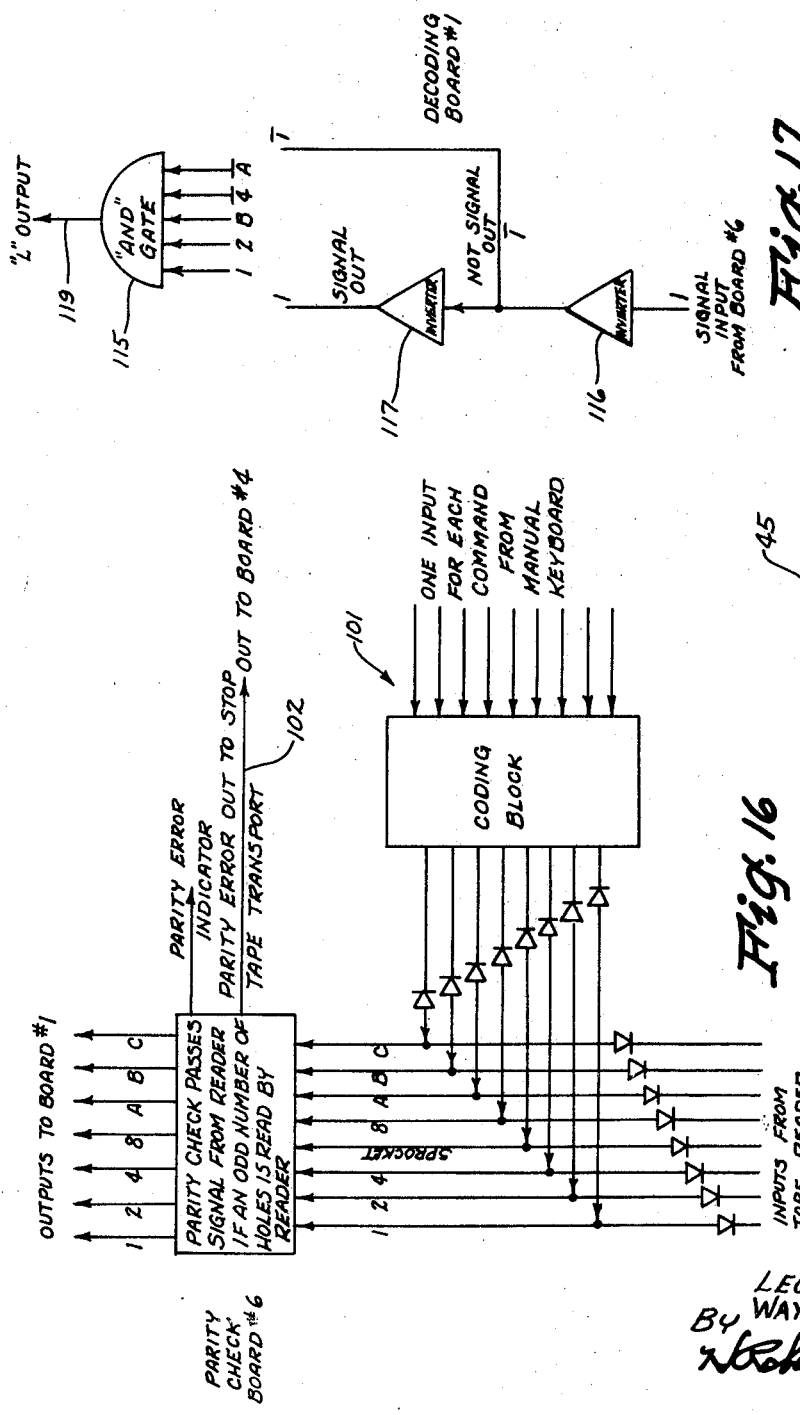

United States Patent Office 3,500,154
Patented Mar. 10, 1970

3,500,154
DIGITAL CONTROL FOR A STEPPING MOTOR DRIVE USED IN AN AUTOMATIC DRAFTING MACHINE
Leon J. Arp, 1305 Highland Ave., Blacksburg, Va. 24060, and Wayne C. Dowling, 2909 Summit St., Sioux City, Iowa 51104
Filed May 9, 1967, Ser. No. 637,153
Int. Cl. G05b 11/01
U.S. Cl. 318—18   2 Claims

ABSTRACT OF THE DISCLOSURE

This invention pertains to the electrical circuitry for an automatic drafting machine, wherein the path and components interposed therein, either in block and/or specific form, are described for translating command signals from a tape reader, or the like into energization pulses for a pair of stepping motors for moving a drafting pen in incremental steps.

The invention pertains urther to an electrical circuit wherein either or both motors move the pen in a straight line a predetermined distance in response to each driving pulse delivered to the driving motor or motors. Further, a straight line segment consisting of a plurality of straight line increments, may be drawn by electrically setting a number read from the program tape into a counter. The number set into the counter represents the number of straight line increments contained in the desired line segment. A second command, read from the programmed tape indicates the direction in which the straight line segment will be drawn.

BACKGROUND OF THE INVENTION

The invention relates to the field of digital or incremental automatic drafting machines, and particularly to the electrical circuitry therefor.

Automatic drafting machines, or plotters as they are sometimes called, fall into two general classifications, incremental and continuous path. The continuous path system is potentially the best, but has the drawback of depending upon a definite voltage level, at times difficult to maintain. In addition, with an analog system, the response of the electronics associated with the driving servos and feedback circuits must be linear over the entire range of the system, and maintain a constant and reproducible response at varying temperatures.

The incremental plotter moves the pen in discrete, straight line increments. Each time the plotter receives an input command the pen is advanced one increment, a length of step distance. The drawing pen is always positioned in terms of a multiple of the step distance. All curved lines are merely approximated by many very short, straight line increments, thus the shorter the straight line the smoother the curved line. Although the positioning accuracy of the incremental plotter is dependent to a degree upon the accuracy of the mechanical drive, it is not dependent upon the stability and linearity of its electronic components.

SUMMARY OF THE INVENTION

It is an object of this invention to provide an automatic digital or incremental drafting machine wherein the control command means need only read, so to speak, twice to put a certain length of a line, which is a multiple of the pen increment movement per energization of the respective driving motor, and the direction of the line into the machine, such that a pulse generator within the machine system provides the pulses to step the driving motor(s), rather than the external control command means.

It is another object of this invention to provide an automatic incremental drafting machine wherein the desired length of a line is placed in a counter circuit, and with the drive motors causing the counter to count down to a zero count, and then stop the motors, thus effecting a savings in the need for external command, programmed material.

Another object of this invention is the provision of a simple low cost program controlled drafting machine able to accept data from punched paper tape, punched cards, magnetic tape, the output from a digital computer, or from a manual keyboard and the machine's system requiring no air conditioning and capable of operating at temperatures from 50° F. to 120° F.

Yet another object of this invention is the provision of an automatic drafting machine wherein its system may be programmed by a person not skilled in mathematics and using commands and symbols which are meaningful to anyone with a normal understanding of the English language, the system requiring a minimum number of commands to position the pen to any desired location, thereby obtaining maximum efficiency from the program medium.

BRIEF DESCRIPTION OF THE DRAWINGS

FIG. 1 is a small perspective view of the automatic drafting machine of this invention, the rear doors thereof shown slightly ajar;

FIG. 2 is an enlarged plan view of the machine;

FIGS. 3 and 4 are fragmentary elevational views of both doors, showing banks of control circuits, as seen from the lines 3—3 and 4—4 in FIG. 2, respectively;

FIG. 5 is a side elevational view of the machine;

FIG. 6 is a sectional view as taken along the line 6—6 in FIG. 5, and showing interior electric gear in schematic form;

FIG. 16 shows an embodiment of the Board #6 network for checking parity of the incoming automated or manual signals;

FIG. 17 shows an embodiment of the Board #1 network for decoding the incoming pulses; and FIG. 18 is a foreshortened plan view of the eight level punched tape used by the present machine.

DESCRIPTION OF THE PREFERRED EMBODIMENT

Figure 11:
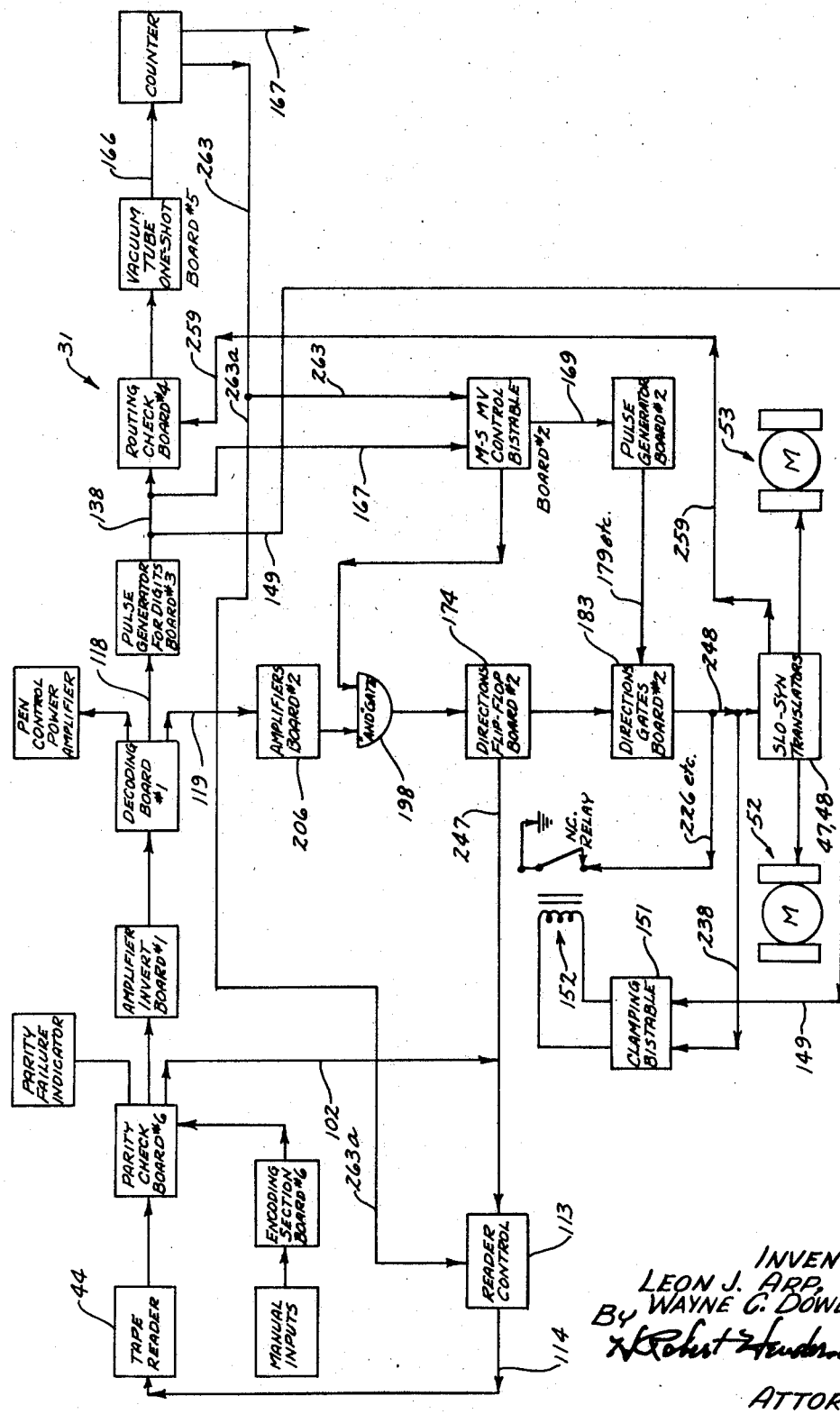
FIG. 11 is a schematic block diagram of the circuit of the present invention.

The automatic drafting machine of this invention is indicated generally at 30 in FIGS. 1 and 2, with the general schematic therefor indicated generally at 31 in FIG. 11. The machine is housed by a pair of side panels 32 and 33, a front lower panel 34, left and right control panels 35 and 36 respectively, a drafting board panel 37, top panel 38, and bottom panel 39.

The rear of the housing comprises a pair of hinged door panels 41 and 42 over a stationary rear base panel 43. On each door panel is mounted a trio of Boards, each Board comprising in the main a definable sub-circuit as a part of the whole 31. Suffice it at this time to identify the Boards on door panel 41 as #3, #4, and #2 from top to bottom, and on door panel 42 as Boards #5, #1, and #6.

Figure 7:
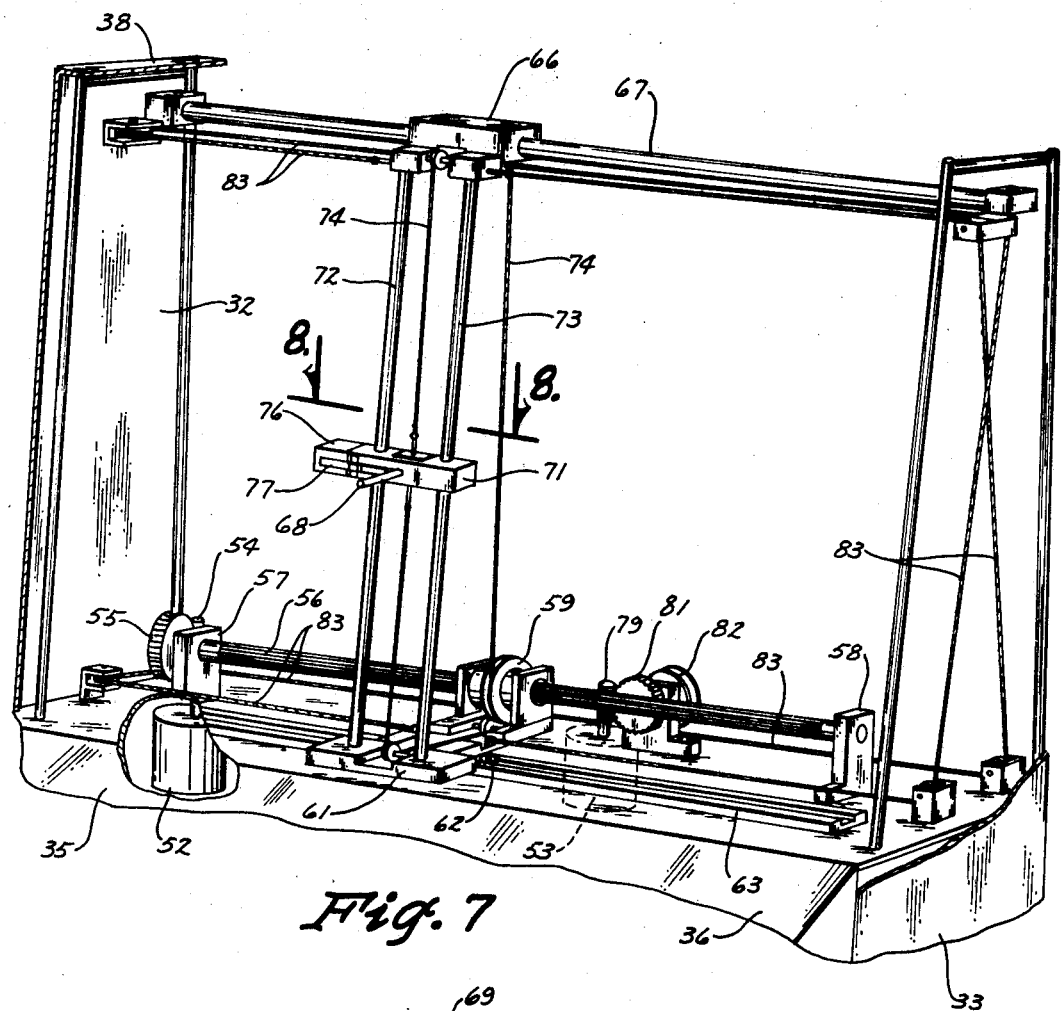
FIG. 7 is an enlarged, fragmentary, perspective view of the drive and control structure of the machine, certain parts broken away and others shown in section for clarity of illustration.

A punched tape reader 44 (FIG. 1) mounted on one side of the machine housing is provided for reading a conventional paper tape 45 (FIG. 18) having in this instance seven punch columns plus one column used for the tape transport sprocket. Within the base of the housing, as shown in FIG. 6, the heavier electrical gear is mounted, the main part of the tape reader indiacted at 46, the power supply at 47, a pair of translators at 48 and 49, and a counter at 51. To any power supply 47, a 117 v. A.C. current is converted to a D.C. current. This drives the other electronic equipment, which equipment reads a zero to fifteen volt signal fed out from the tape reader 46, amplifying that to −24 v. and converts the signals to energize a pair of synchronous motors 52 and 53 (FIG. 7).

Operation of the motor 52 rotates by means of a worm gear 54 an anti-backlash worm wheel 55 which in turn rotates a spline shaft 56 extended completely across the machine on an X-axis. The shaft 56 is rotatably mounted by a pair of supports 57 and 58. Slidably mounted on the shaft 56 is a wheel 59 which in turn is rotatably mounted on and carries a slide block 61, adapted to horizontal movement as maintained by a rollered connection at 62 with a guide track 63.

Figure 8:
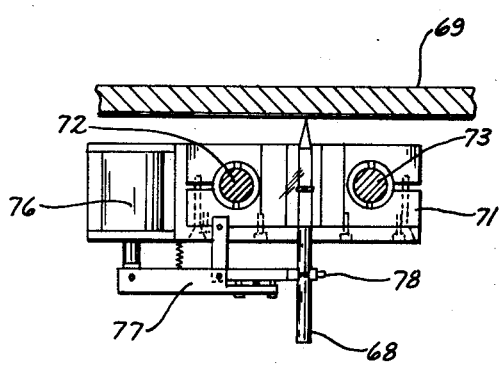
FIG. 8 is an enlarged plan view of the drafting pen carrier in relation to a drafting board, as taken on the lines 8—8 of FIG. 7.

Mounted on and movable with the slide block 61 is an upright unit 64 having a block 66 at its upper end supported on and movable across a rod 67 secured to the machine housing. The drafting pen 68 for the drafting board 69 (FIG. 8), drafting paper 70 shown in FIG. 1, is carried by a carrier unit 71 slidably mounted on the upright members 72 and 73 of the upright unit 64, and is controlled as to its movement by a pulley and cable unit, the cable 74 wrapped about the wheel 59.

Thus, in response to energization of the synchronous motor 52, that in response to actuation of the circuitry 31 (FIG. 11), the drafting pen is moved upwardly and downwardly on a Y-axis. A solenoid 76 (FIG. 8) is provided for raising and lowering the pen 68 relative to the board 69, via a pivot arm 77, and with a floating arm 78 provided for maintaining fine control of the pen 68.

Operation of the other motor 53 also causes via a worm gear 79 and an anti-backlash worm wheel 81 rotation of a hub 82. Another continuous cable 83 is connected, by a series of pulleys about which the cable is entrained, to both sides of the upper and lower slide blocks 61 and 66, wherein operation of the motor 53 results in reciprocal movement of the slide wheel 59, the blocks 61 and 66, the upright unit 64 and the drafting pen carrier unit 71 mounted thereon. It is to be noted that operation of both motors 52 and 53 can therefore move the drafting pen 68 in a direction other than on either an X- or Y-axis.

Figure 9:
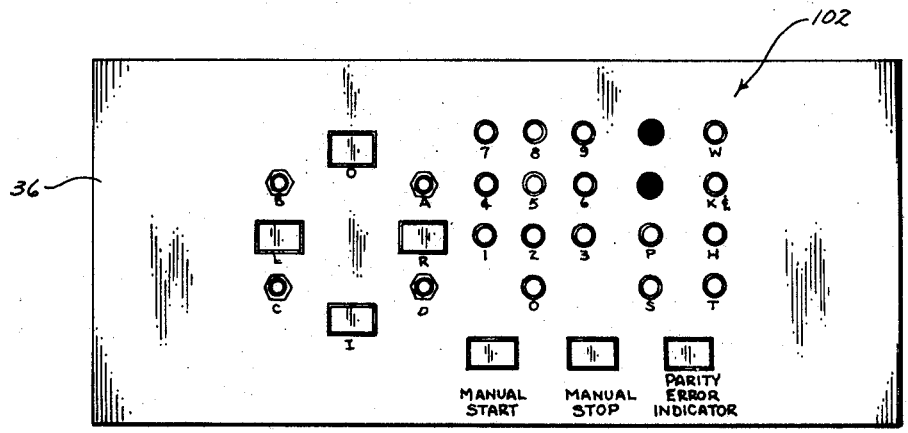
FIG. 9 is an enlarged plan view of the right side of the control panel of FIG. 2.

Referring to FIGS. 16 and 18, the arrangement is such that either manual command inputs at 101 from the manual keyboard 102 (FIG. 9) can be put into a Coding Block for transmission to a parity check of conventional arrangement on Board #6, or the coded binary inputs from the tape reader 44 (FIG. 1) can be forwarded to the parity check. From FIG. 9, where a plurality of push-return switches are shown, it is seen that eight direction commands can be put into the Coding Block, namely O for driving the pen 68 upwardly, A for driving the pen upwardly and to the right at 45°, R for a straight right movement, D for right and down at 45°, I for straight down, C for left and down at 45°, L for straight left, and B for left and up at 45°. Digital number inputs of from 0 throuh 9 are provided, with the other lettered switches calling for special auxiliary functions, such as setting the pen down on the board 69, and traversing it while lifted.

A light for Parity Error Indicator is provided for visual notification of same, and Manual Start and Stop buttons are provided. The Stop button enables the tape reader 44 to be stopped so that data may be inserted into a drawing manually if desired.

Figure 10:
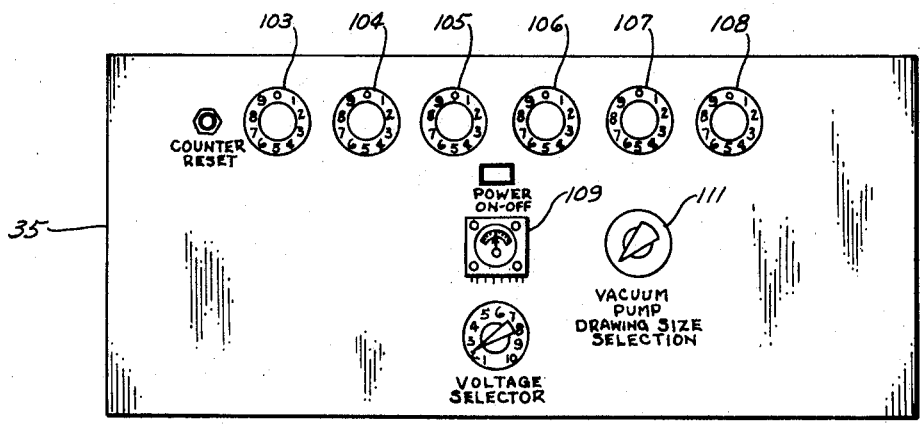
FIG. 10 is an enlarged plan view of the left side of the control panel of FIG. 2.

On the left counter 35 (FIG. 10), the six cold cathode glow transfer tubes 103, 104, 105, 106, 107, and 108, representing the number 999,999 or any division thereof, reading from left to right, are shown. These tubes are specified at a counting rate of 4,000 pulses per second and are commercially available. Below the tubes, a Power On-Off switch is shown with a voltage check meter 109 for all the system's voltages, the Voltage Selection knob being shown. A valve 111 for turning on a Vacuum pump (not shown) to place a vacuum on a certain area of the drafting board 69 is provided.

Referring back to FIGS. 16 and 18, coded inputs 1, 2, 4, 8, A, B, C and D from the eight level tape 45 are shown coming into the Parity Check Board #6. A digit or a direction is coded in terms of a combination of holes punched in the eight level tape 45, and is read by the reader 44 into the Parity Check Board #6. If an odd number of holes 1, 3, 5 or 7 are passed to the parity check Board #6, the signal is then passed on to Board #1 (FIG. 17); if not, the Parity Error Indicator on the control panel 36 goes on, and a signal is sent by line 102 (see FIG. 11) to a Tape Reader control 113 to stop, via line 114, the Reader 44.

Upon a signal, 1 for example, being sent out from the Parity Check Board #6, it is received at the Board #1 (FIG. 17), having been changed from a 15 v. pulse to a −24 v. pulse, where it is inverted by a transistor 116 for amplification purposes. The signal, as a pulse, is then split into two paths, one a Not Signal out as a zero volt pulse, indicated by a bar over the number 1, and the other as a Signal out, just 1, having been inverted again by another transistor 117. There is an inverter circuit for each of the seven levels of the tape 45, and wherein each inverter circuit produces either a Signal Out or a Not Signal Out. The eight level D of the tape 45 is not used herein, but is available.

Figure 12:
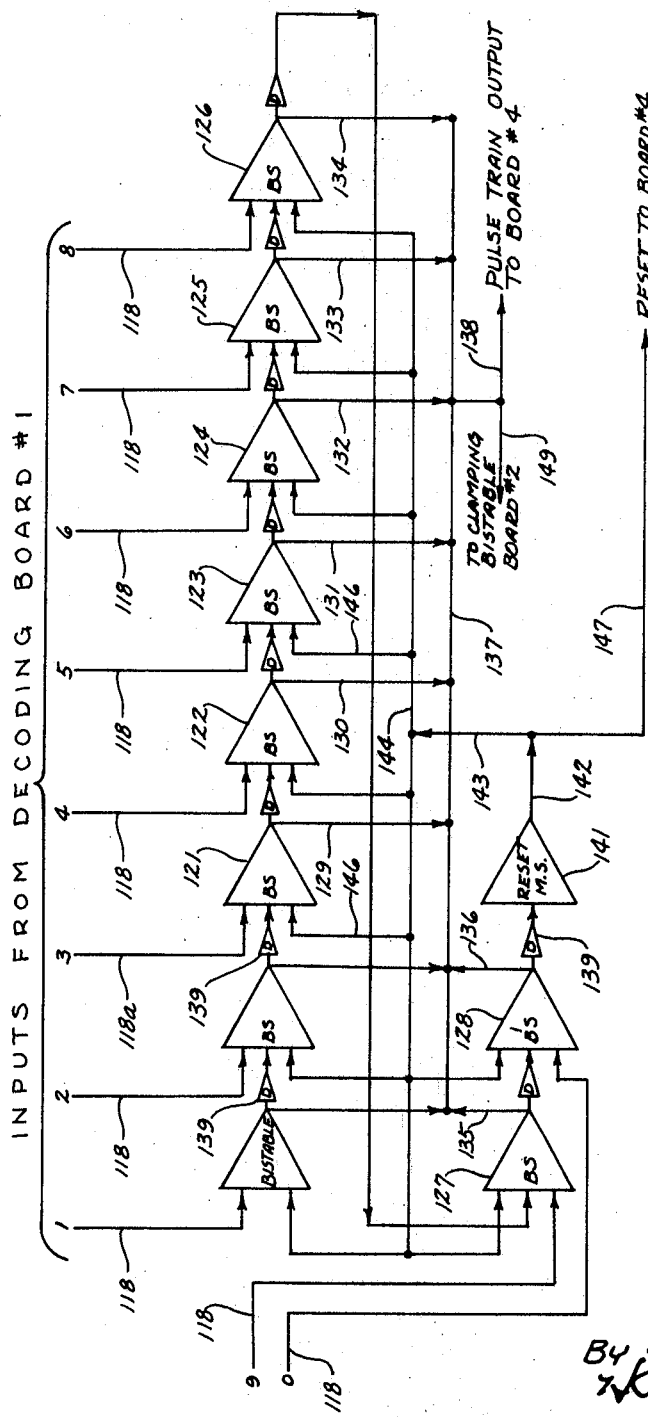
FIG. 12 is an embodiment of the Board #3 network for generating pulses.
Figure 14:
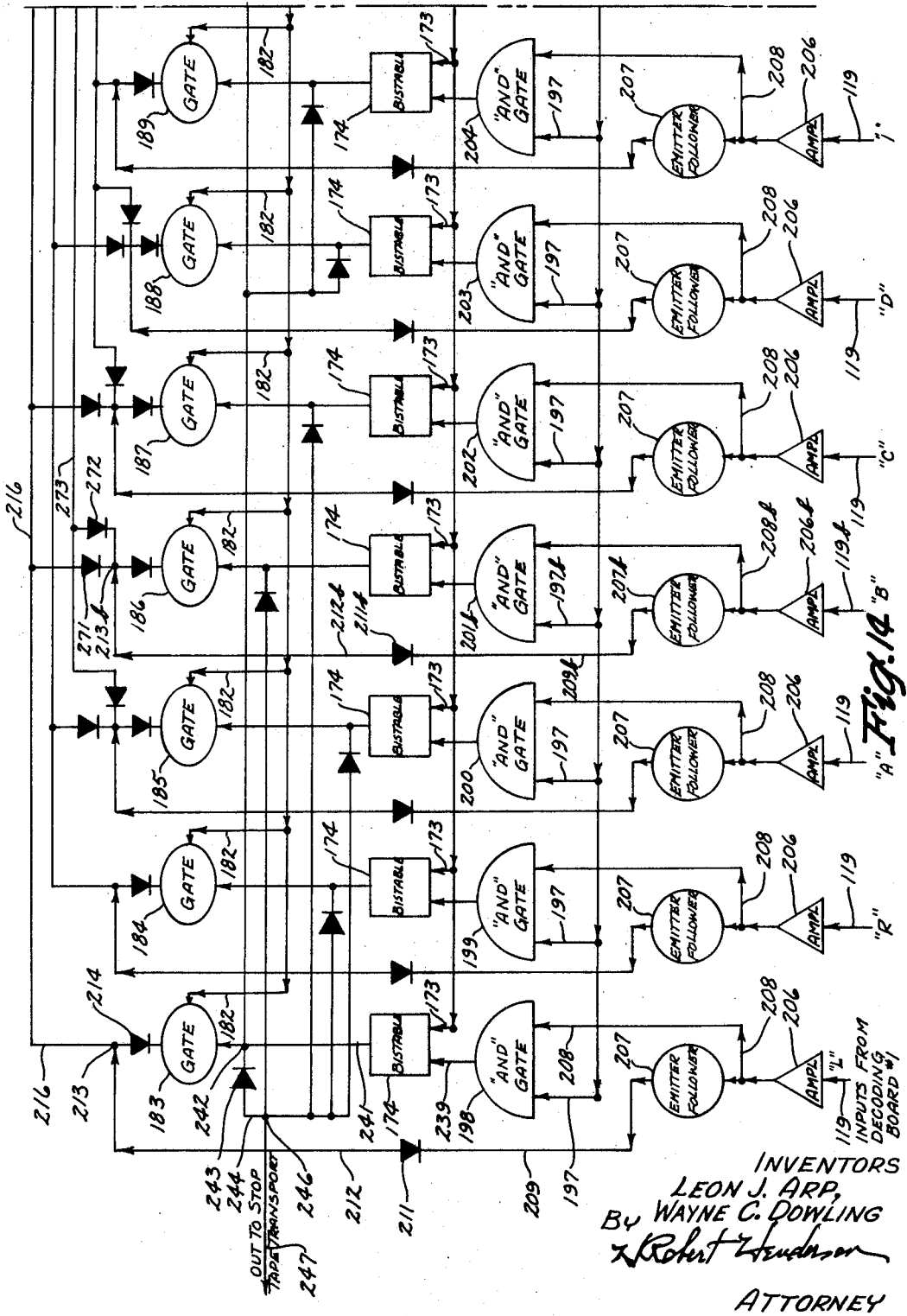
FIGS. 14 and 15, when laid end-to-end with FIG. 14 on the left of FIG. 15, shows an embodiment of the Board #2 network for directing the direction signals to the correct translator and motor, and showing the multi-vibrator sub-circuit which takes the place of the command signals.

At the upper part of FIG. 17, an AND gate 115 is shown for passing the signal L therethrough. Should a number command, such as 321, meaning 321 increments it is desired the pen 68 move, be received by the Decoding Board #1 (see FIG. 11), this command is sent directly via line 118 to a Pulse Generating Board #3 (see FIG. 12), described hereinafter. Conversely, an AND gate 115 (FIG. 17) is provided for each direction and other commands, with a certain code therefor. For example, the code for transmitting an L output signal from Board #1 is 1, 2, B, $\bar{4}$, and $\bar{A}$, with the other commands having their own predetermined codes. Thus, by electrically connecting the inverter channels with the AND gates of Board #1, directions are transmitted out on lines 119 (see FIGS. 11 and 14) to the ROUTING BOARD #2 (FIGS. 14 and 15) and numbers are transmitted on lines 118 to the PULSE GENERATING BOARD #3 (FIG. 12).

Figure 13:
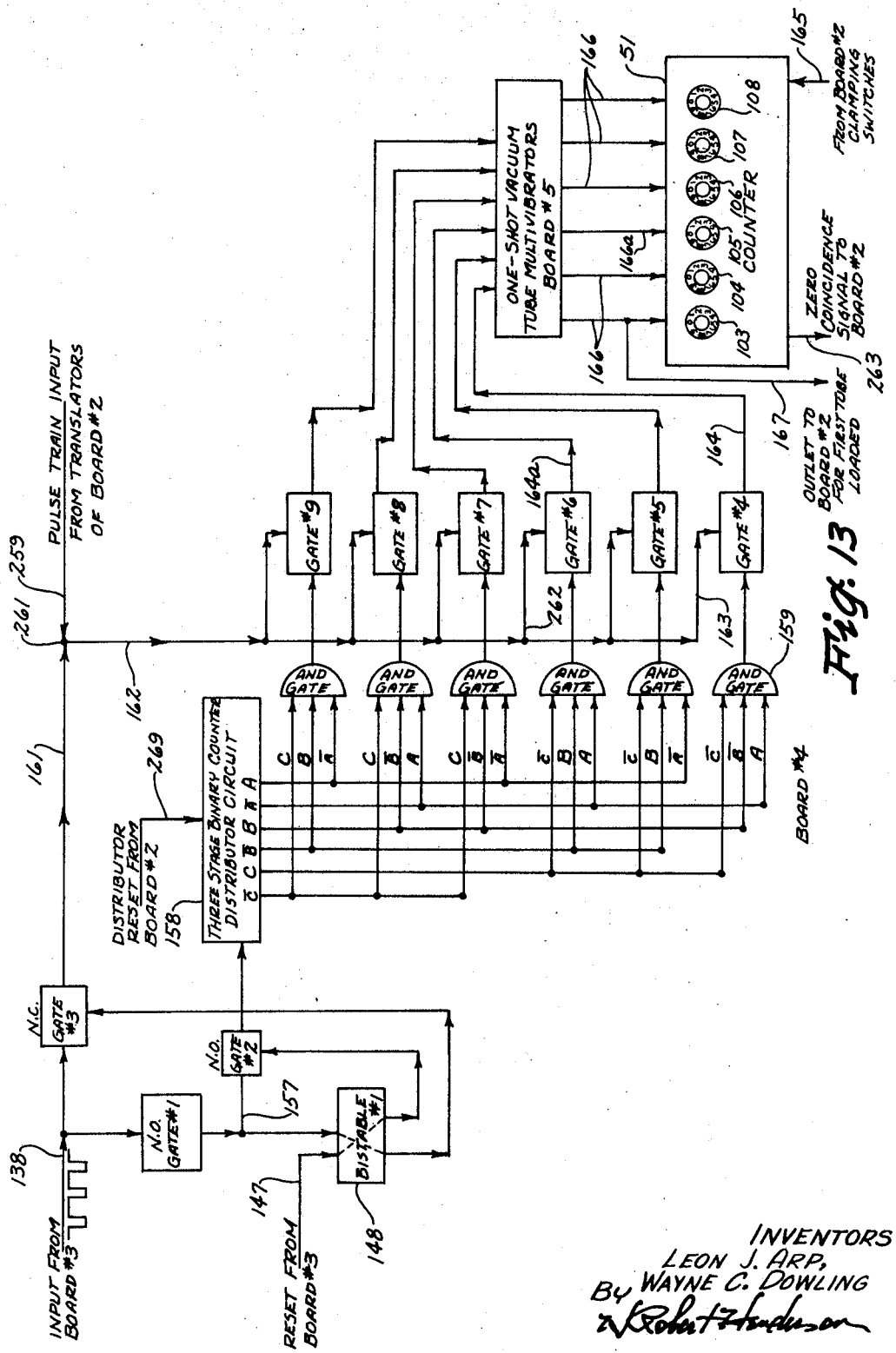
FIG. 13 is an embodiment of the Board #4 and Board #5 networks for routing the numbers pulses to the counter.

On Board #3 (FIG. 12) the first input signal, for example the digit 3 for the command number 321, comes in on line 118a to the top side of a bistable multi-vibrator 121 of a string of bistable multi-vibrators arranged to cascade down and trigger a number of pulses from the number ten down to the value of the digit put in, plus one for all non-zero digits, or only one pulse for the digit zero. Thus, when the digit 3 was put in, seven plus one or eight total pulses are triggered, with BS–MV 121 through 128 providing the eight pulses sent through lines 129–136 to line 137, and from there on line 138, the PULSE TRAIN OUTPUT line, to Board #4 (FIG. 13). The purpose for these pulses will be described hereinafter.

Between each bistable is a delay 139, which delays passing the signal on to the next bistable for a few milliseconds. Next to the last bistable is a reset monostable 141 which, when tripped by the last pulse of the bistable circuit 128 sends a signal through lines 142, 143, 144, and all lines 146 to the lower side of each bistable to reset same for the next digit command to be put therein. Thus, the second command digit of 2 will result in nine pulses out, and the third command digit of 1 resulting in ten pulses out through line 138. The reset monostable 141 also sends a pulse through lines 142 and 147 to Board #4 (FIG. 13) for resetting a bistable 148 (FIG. 13) to be in position to receive the next command digit series of pulses, namely the digit 2. The digit 0, however, requires no pulses, being transmitted on line 118 directly to the bistable 128, with one pulse being sent out through line 137.

The first pulse of each group of pulses out of the Board #3 Pulse Generating circuit has a dual function, and shows the reason for providing an extra pulse. It is forwarded through line 138 to Board #4, and also through line 149 to a clamping bistable 151 (FIG. 15), which energizes a clamping relay 152 to change the position of four banks of switches 153, 154, 155, and 156 as illustrated. The importance of this will be seen hereinafter.

The first pulse to Board #4 (FIG. 13) enters on line 138, meets a normally closed Gate #3, and passes through a normally open Gate #1 to trip a Bistable #1. The same pulse passes through line 157 and a normally open Gate #2 to a Three Stage Binary Counter Distributor Circuit 158. The Distributor Circuit 158 is a conventional binary circuit comprising three bistables (not shown) making a three stage binary counter for emitting A or $\bar{A}$, B or $\bar{B}$, and C or $\bar{C}$ pulses depending upon the number of input pulses. The first pulse into the Distributor Circuit 158 is used to set up the circuit 158 to use the remaining pulses according to their digit command. Thus, as the left most tube 103 is always set first, the first pulse coming into the Distributor Circuit is set to result in an A, $\bar{B}$, $\bar{C}$ combination which then transmits a signal from the AND Gate 159 to open Gate #4.

At the same time that the Bistable #1 was tripped, and after Gate #2 had passed the first pulse, the tripping resulted in closing Gate #2 and opening Gate #3 such that all succeeding pulses, seven for the digit three, are then routed through lines 161 and 162 to the six Gates for the six Counter tubes. As all gates are closed, but Gate #4, the pulses are passed through line 163 to Gate #4, and line 164 to Board #5 which comprises six one-shot vacuum tube multivibrators (not shown) for amplifying the signal pulses to get a needed high voltage. The seven pulses are then fed through line 166 to the cold cathode glow transfer tube 103, with the 0 to 9, 9 to 8, 8 to 7, 7 to 6, 6 to 5, 5 to 4, and 4 to 3 pulses stepping the glow in the tube backwards, all tubes having been set initially at zero, setting thereby the number 3 into the left most tube 103.

The second digit 2, of the command number 321 changes the Distributor Circuit 158 to open Gate #5, and the third digit, 1, both having passed through Board #3 in the same manner as the digit 3 causes Gate #6 to open whereby the numbers 2 and 1 are set into the tubes 104 and 105, sequentially in the same manner as the digit 3. What has occurred therefore is an electronic setting of the number 321 into the Counter 51.

Figure 15:
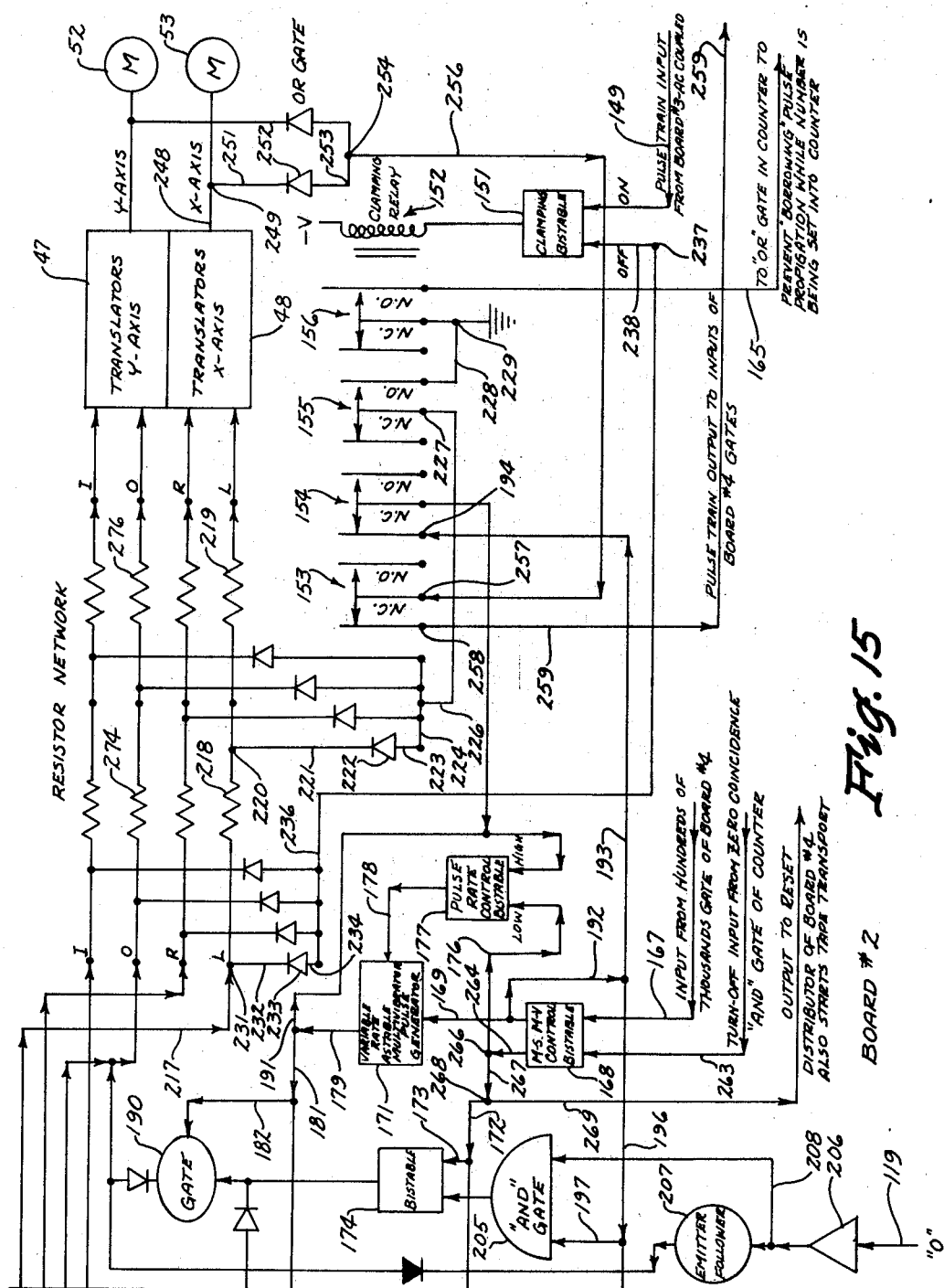

While the command digit pulses are being set into the tubes 103–108, it is necessary to prevent one tube, such as tube 104, from borrowing a pulse from another, such as tube 103. The counter 51 includes an OR gate (not shown) electrically connected between each adjacent pair of tubes, utilized in its count down wherein the tube 104 does borrow from the tube 103, for example, in much the same manner as a mechanical subtracting machine. The left tube, 103 for example, is decremented by one upon the right tube, 104 for example, decrementing from state 0 to state 9. To prevent, however, the tubes from borrowing during the pulse input, the borrowing gate is grounded through line 165, changed switch 156, and junction 229 (FIG. 15). As will be seen hereinafter, the switch 156 is returned to its illustrated condition during the count down of the counter 51 such that the borrowing OR gate is no longer grounded.

When the first tube 103 was receiving its loading pulses, a signal from the line 166 was derived therefrom to be transmitted via line 167 to a monostable multi-vibrator control bistable 168 (FIG. 15) to create a potential via line 169, whereby a variable rate astable multi-vibrator pulse generator 171 is activated at approximately 100 pulses per second. At the same time, a signal is applied from control bistable 168 through lines 264, 267, junction 268, line 172, and lines 173 to the right side of a bistable 174 for each of the direction commands.

The signal generated by the pulse generator 171 is delivered by lines 179, 181 and 182 to all of the upper gates 183, 184, 185, 186, 187, 188, 189 and 190. It is also sent via line 191 to the high side of the pulse rate control bistable 177 whereby the pulsing rate of the pulse generator 171 is slowly increased to 200 pulses per second, and wherein it can safely run as high as 300 pulses per second.

This safeguards the operation of the stepping synchronous motors 52 and 53, and allows them to start up slowly from a standing stop, to always track and be synchronous with the pulse generator 171, whereby the stepping motors will not miss a single pulse, and will always match the rate of the pulse generator 171. Another line 192 from the control bistable 168 connects with a line 193 to the left junction 194 of switch 154, but as the switch is in a N.O. position due to energization of the clamping relay 152, that lead stops. The line 192 is also connected to line 196 which leads to lines 197 for the left side of each direction AND Gate 198, 199, 200, 201, 202, 203, 204 and 205.

When the direction L comes from Board #1 into Board #2, via a line 119, it is directed to an amplifier 206, there being an amplifier and an identical emitter following circuit as illustrated for each direction command. From the amplifier 206, the signal is directed in two paths, one through an emitter follower 207, and one through a line 208 to the right side of the AND Gate 198.

From the follower 207, the signal passes through a line 209, diode 211, line 212 to a junction 213 where it is prevented from backing into the Gate 183 by a diode 214. It passes on through lines 216 and 217 into a resistor network, in this case, resistances 218 and 219. Due to such resistance, the signal goes to ground through junction 220, line 221, diode 222, lines 223, 224 and 226 to the center terminal 227 of the switch 155. As the relay 152 had been activated by a pulse from pulse generating Board #3 having been placed into the bistable 151, the switch 155 is closed to ground through the line 228 and junction 229.

The resistance 218, however, permits a signal to be sent from line 217 through junction 231, line 232, diode 233, lines 234 and 236 to a junction 237 and line 238 leading to the clamping bistable 151, thus unclamping it and returning the switches 153–156 to their illustrated conditions.

Returning to the L AND Gate 198, with the pulse generator 171 working, both the control bistable 168 signal and the direction signal 208 are present at the Gate 198, which therefore produces an output through line 239 which trips the bistable 174, producing thereby an output through line 241 to open the Gate 183, whereby all pulses being generated by the pulse generator 171 flow through the Gate 183 and diode 214 to line 216. It should be noted here that the first pulse through line 241, due to a numbers command followed by a direction command being received at the Gate 198, is directed from junction 242, diode 243, line 244, junction 246, and line 247 (see FIG. 11) to the Tape Recorder Control 113, whereby the Tape Reader 44 is stopped.

The pulses through line 216, generated by the pulse generator 171 are then transmitted through the resistances 218 and 219 to an appropriate Translator, in this case 48 for the X-axis. Each Translator is designed for use with its respective synchronous motor, and is designed to step the motor so as to provide an incremental pen movement of .002 inch per pulse. As the pulses are transmitted through line 248 to energize the motor 53, they are also fed as signals through a junction 249, line 251, diode 252, line 253, junction 254, line 256, terminal 257 of switch 153, through the normally closed switch 153 to junction 258 and line 259 to a junction 261 on Board #4 (FIG. 13) for being applied through a gate to a respective tube. It will be remembered that Gate #6 was the last and only Gate open when the digit 1 of the command number 321 was put into tube 105.

Thus with the command number 321 set into the counter tubes 103, 104 and 105, the pulses coming through line 259 are directed through junction 261, line 262 to Gate #6, and through line 164a for Gate #6 to and through the one-shot multivibrator and line 166a to tube 105. Each pulse causes the glow in tube 105 to move from 1, 1 having been set therein, to 0 to 9, whereupon the counter circuit causes the glow in tube 104 to move from 2, 2 having been set therein, to 1. Tube 105 continues to count down. This action continues, with each time the glow transferring from 0 to 9 in a tube resulting in the tube to the left thereof losing a digit, until all tubes 103, 104 and 105 reach zero. A mechanical counterpart of this electronic count down arrangement is found in a Veeder-Root-type counter running backwards.

When the counter 51 (FIG. 13) reaches zero, it sends a signal out through line 263 (FIG. 15) to the control bistable 168. The signal effects a removal of the −24 v. supply for the pulse generator 171, which then stops such that no more pulses are sent to the Translator 48. Secondly, a −24 v. pulse is delivered through line 264, junction 266, line 267, junction 268, and line 269 to the binary counter distributor circuit 158 (FIG. 13). This causes all the Gates, 4–9 inclusive, to close, and simultaneously, using line 263a (FIG. 11) starts the tape reader 44.

The same pulse is forwarded through lines 173 to trip the bistables 174, and therefore closing all Gates 183–190, readying the Gate circuitry for the next command. A pulse is also sent from the control bistable 168 through line 264, junction 266, line 176 to the low side of the pulse rate control bistable 177. This leaves the bistable 177 in the low rate condition for the next numbers command, as described hereinbefore. The desired line segment of 321 .002 inch increments has now been completed, and the tape transport 44 is again running.

Assume the next command results in a direction B passed through the parity Board #6 and decoded at Board #1, then sent through line 119b (FIG. 14) to the amplifier 206. The pulse is then again routed the two paths through the line 208b to the right side of the AND Gate 201b; and also through the path of the emitter follower 207b, line 209b, diode 211b, line 212b, and to junction 213b. At the AND Gate 201b, the signal is stopped because no signal is present on line 197b, as no number command preceded the direction command B.

From the junction 213b, the signal is directed through a pair of diodes 271 and 272, wherein pulses are transmitted through lines 216 and 273 through the resistances 218 and 219 for line 216, and 274 and 276 for line 273, to both Translators 47 and 48. Thus, both motors are stepped one pulse, resulting in the pen 68 moving left and out simultaneously such that a 45° diagonal line, the length of which is equivalent to two times the square root of .002 inch squared, is drawn. The motors stop again until the next command.

I claim:
1. In a digital drafting machine having a frame, a drafting pen, a drafting board mounted on the frame, a carriage including an electromagnetic device for holding the pen relative to the board in response to operation of the device, a first mechanism including a first stepping motor for moving the carriage on an X-axis relative to the board, a second mechanism including a second stepping motor for moving the carriage on a Y-axis relative to the board independent of or simultaneously with movement of the pen on the X-axis, control means for emitting a series of command pulses, parity check means for receiving and checking the command pulses, and means for decoding the command pulses and separating same into any one of a plurality of special command signals including operation of the device, into any one of a plurality of direction signals for moving the carriage in a predetermined direction, and into any one of a plurality of digit signals for moving the carriage a predetermined distance, the improvement comprising:

a counter circuit for receiving and storing a predetermined number of pulses representing a certain digit signal for moving the carriage a predetermined distance;

a pulse generating circuit for generating a predetermined number of pulses in relation to the certain digit signal received from the decoding means;

a pulse distributing circuit for distributing the generated pulses to said counter circuit where the generated pulses are stored;

a pulse generator responsive to a signal from said counter circuit when said number of pulses are stored therein to generate a series of pulses;

a pulse converter circuit for converting a series of pulses into a switching sequence for driving said motors in relation to the number of pulses in the series;

a gate circuit responsive to said series of pulses and to a direction signal when following a digit signal to transmit said series of pulses to said converter circuit; and a transmitting circuit for transmitting said series of pulses also to said counter circuit through said pulse distributing circuit for sequentially digitally reducing the stored pulses in direct relation with operation of said pulse generator until zero pulses remain in said counter circuit, said transmitting circuit operable to send a zero coincidence signal used to shut down said pulse generator wherein said converter circuit is also shut down; and wherein said pulse distributing circuit comprises a three stage binary distributor circuit connected with a plurality of AND gates, and a Gate connected to each AND gate for control thereby and connected further to said counter circuit, and wherein said series of pulses from said transmitting circuit is led therefrom through an open Gate to said counter circuit for effecting a count down thereof to said zero coincidence; and further wherein said binary distributor circuit is responsive to an extra one of a series of pulses received thereby, in response to each digit command signal from said pulse generator circuit to open an AND gate, and wherein means are provided for leading the remainder of said pulses through said open AND gate.

2. The improvement in a digital drafting machine as defined in claim 1, and wherein one of said pulses passed through said AND gate is led to said pulse generator circuit for activation thereof.

References Cited

UNITED STATES PATENTS

| 3,015,806 | 1/1962 | Wang et al. | |
| 3,069,608 | 12/1962 | Forrester et al. | |
| 3,146,386 | 8/1964 | Gerber | 318—8 |
| 3,218,535 | 11/1965 | Holthaus et al. | 318—138 |
| 3,241,017 | 3/1966 | Madsen et al. | 318—138 |

THOMAS E. LYNCH, Primary Examiner

U.S. Cl. X.R.

33—18; 318—138, 162